Jan. 22, 1929.
J. G. BLUNT
1,699,604
LOCOMOTIVE TRUCK EQUALIZER
Filed June 24, 1926
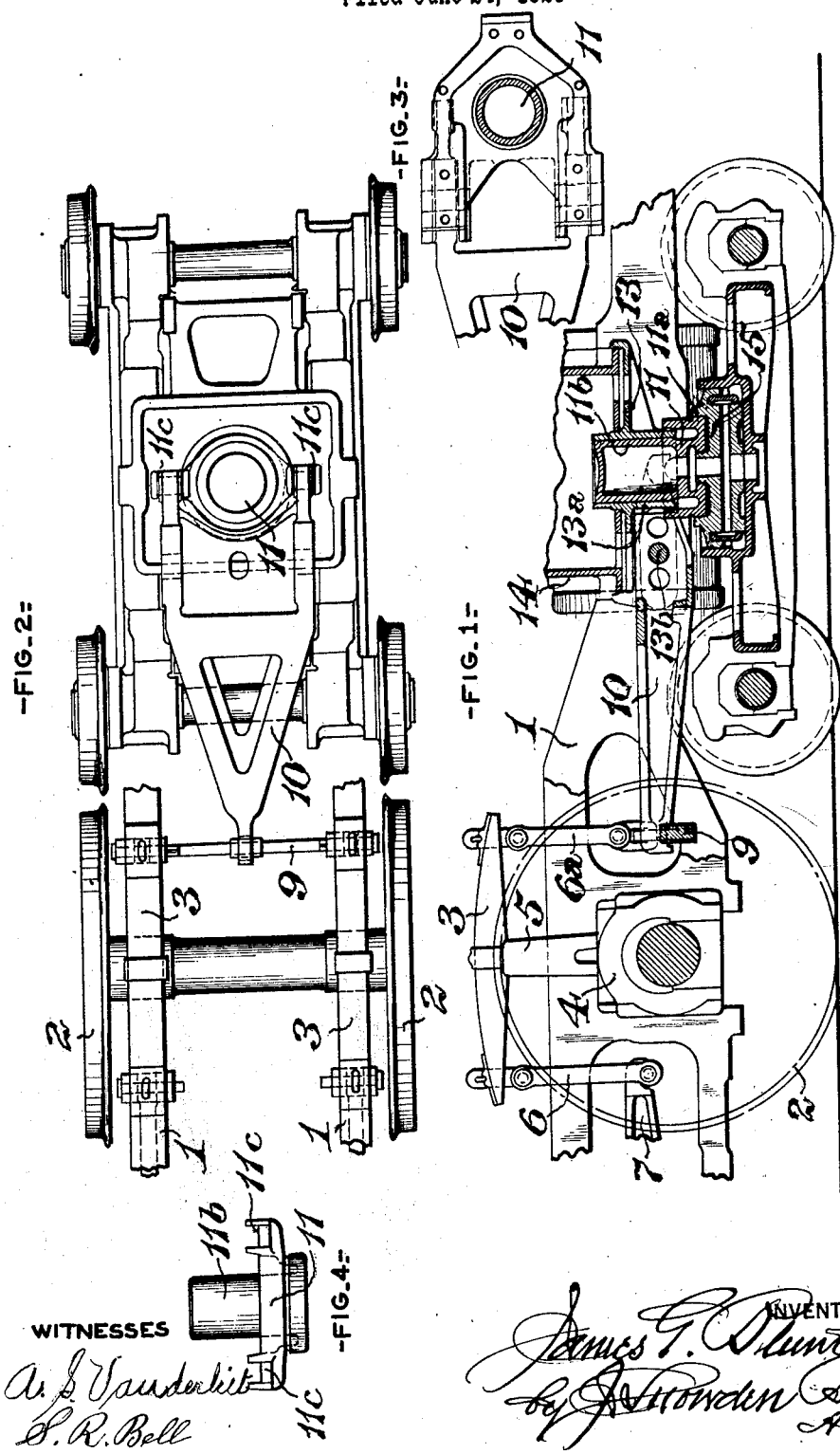

Patented Jan. 22, 1929.

1,699,604

UNITED STATES PATENT OFFICE.

JAMES G. BLUNT, OF SCHENECTADY, NEW YORK.

LOCOMOTIVE-TRUCK EQUALIZER.

Application filed June 24, 1926. Serial No. 118,161.

My invention relates to locomotives having leading trucks, and its object is to provide a construction whereby the load carried on the leading truck may be effectively equalized with that carried by the driving wheels. Further objects are to effect such equalization by a construction having greater lateral stability than those heretofore in practice, and to provide a construction which will be applicable in connection with a leading truck of the ordinary type, without modification of any of the members of the truck. When the loads on the truck and on the driving wheel system are independent of each other, undesirable conditions may result from improper distribution of the loads, but, by the provision of properly designed equalizing means, the relative loads may be brought to agreement with a predetermined proportion.

The improvement claimed is hereinafter fully set forth.

In the accompanying drawing: Figure 1 is a partial vertical longitudinal central section, through the forward portion of a locomotive, illustrating an embodiment of the invention; Fig. 2, a plan view of the same; Fig. 3, a similar view of the equalizer fulcrum; and, Fig. 4, a front view, in elevation, of the truck centre pin.

In the practice of my invention, referring descriptively to the specific embodiment thereof which is herein exemplified, the portion of the weight of the locomotive which is supported on the driving wheel system (only the front pair of driving wheels, 2, of which is indicated in the drawing), is carried upon springs, 3, which, in turn, rest on the tops of the driving axle journal boxes, 4, through the intermediation of spring saddles, 5. The lower ends of the depending spring hangers, 6, in rear of the forward ones of the front pair, are connected to equalizers, 7, located between the pairs of driving wheels and fulcrumed in the main locomotive frame, 1, in the usual manner. The weight on the driving wheels is thereby equalized between all of them which comprise the system.

The forward spring hangers, 6ª, of the front pair of driving wheels, 2, are, in accordance with my invention, connected, at their lower extremities, to a transverse equalizer, 9, on the middle of which bears the rear end of a longitudinally extending central equalizer, 10, which is of novel construction, in being forked at its front end, to clear the truck centre pin, 11, and provide two bearing points on the truck, one on each side of its longitudinal central plane. The separation, at some distance apart, of two bearing points, imparts greater stability than would be attainable if but one bearing point was employed, with a straight equalizer located in the middle vertical longitudinal plane of the locomotive.

A circular centre bearing, 11ª, is formed on the lower end of the truck centre pin, 11, said bearing seating into the circular centre plate, 15, as ordinarily formed, this construction permitting the swivelling of the truck, relatively to the centre pin, and necessitating no change in the ordinary truck construction. The upper portion of the truck centre pin, 11, is formed as a cylindrical spindle, 11ᵇ, adapted to rise and fall with the truck, while guided in a sleeve, 13ª, projecting downwardly from an equalizer bracket, 13, which is bolted to the lower side of the cylinder saddle, 14. Bearing points, 11ᶜ, for the front ends of the forked equalizer, 10, are formed integrally with the centre pin, 11, on each side of the spindle, 11ᵇ.

Each of the side walls of the equalizer fulcrum 13, is provided with a jaw, into which the equalizer, 10, is fulcrumed by pins, 13ᵇ. A plurality of holes is formed in the jaws, to enable the location of the fulcrum pins to be changed, should it be found desirable to alter the distribution of weight. Variation of the location of the fulcrum pins changes the length of the equalizer arms, and thereby correspondingly changes the distribution of the load between the driving wheel system and the engine truck. The sleeve, 13ª is extended upwardly into the cylinder saddle, 14, which is cut away for the purpose of providing a long vertical guiding bearing for the centre pin, 11. Inasmuch as the centre pin fulcrum bracket, 13, is bolted to the cylinder saddle, and the equalizer, 10, fulcrumed in its bearings, at its front end, on the centre pin, 11, it will be obvious that the equalizer, 10, and the centre pin, 11, remain fixed, relatively to the longitudinal middle plane of the locomotive, while swivelling of the truck is provided for, and the truck centre plate, 15, is caused to rotate on the centre bearing, 11ª, of the centre pin.

In the construction herein set forth, the advantages of equalizing the driving wheel load with that on the engine truck, is attained in such manner as to permit all the required movements of the truck relatively to the locomotive, without departure from established and approved truck construction. Furthermore, by the application of the forked equalizer above described, greater lateral stability is attainable than with existing designs, in which a straight equalizer, on the longitudinal middle plane of the locomotive is adopted.

I claim as my invention and desire to secure by Letters Patent:—

1. In a locomotive, fitted with a leading truck, the combination of a main frame; a truck frame; a centre plate in said truck frame; driving springs, on which the main frame is supported; a centre pin having lateral extensions, each providing a bearing seat; and a longitudinally extending equalizer, fulcrumed, between its ends, on the main frame, and comprising a rear end connected to the driving springs, and a bifurcated front end, each of the branches of which bears on one of the bearing seats of the centre pin.

2. In a locomotive, fitted with a leading truck, the combination of a main frame; a truck frame; a centre plate in said truck frame; driving springs, on which the main frame is supported; a centre pin having lateral extensions, each providing a bearing seat; and a longitudinally extending equalizer, comprising a rear end connected to the driving springs, a bifurcated front end, each of the branches of which bears on one of the bearing seats of the centre pin, and two spaced fulcrum bearings disposed in lateral axial alignment intermediate the front and rear ends of the equalizer.

3. In a locomotive, fitted with a leading truck, the combination of a main frame; a truck frame; a centre pin on said truck frame; an equalizer fulcrum, fixed to the main frame and having two lateral bearing points in axial alignment; an equalizer, journaled in said fulcrum and bearing on the centre pin; and a guiding sleeve on said fulcrum, fitting around the centre pin.

4. In a locomotive, fitted with a leading truck, in which the relative weights imposed upon the driving wheels and the truck are determined by an equalizer, the combination of an equalizer having a forked front end; a centre plate, provided with diametrically opposite bearings for the forks of said equalizer; and a cooperating centre plate bearing mounted on the truck.

5. In a locomotive, fitted with a leading truck, and a plurality of driving wheels, the combination, with a main locomotive frame, of means for permitting swivelling movement of the truck and vertical movement to accommodate track irregularities, said means comprising a truck centre pin, a guiding sleeve therefor, fixed to an equalizer fulcrum; and means for establishing weight distribution between the driving wheels and the truck, said means comprising a longitudinal equalizer, fulcrumed at two points in axial alignment on the locomotive frame, acting, by a forked front end, on two diametrically opposite bearings on the truck centre pin, and having its rear end connected to the springs of the front driving wheels.

JAMES G. BLUNT.